Figure 1:
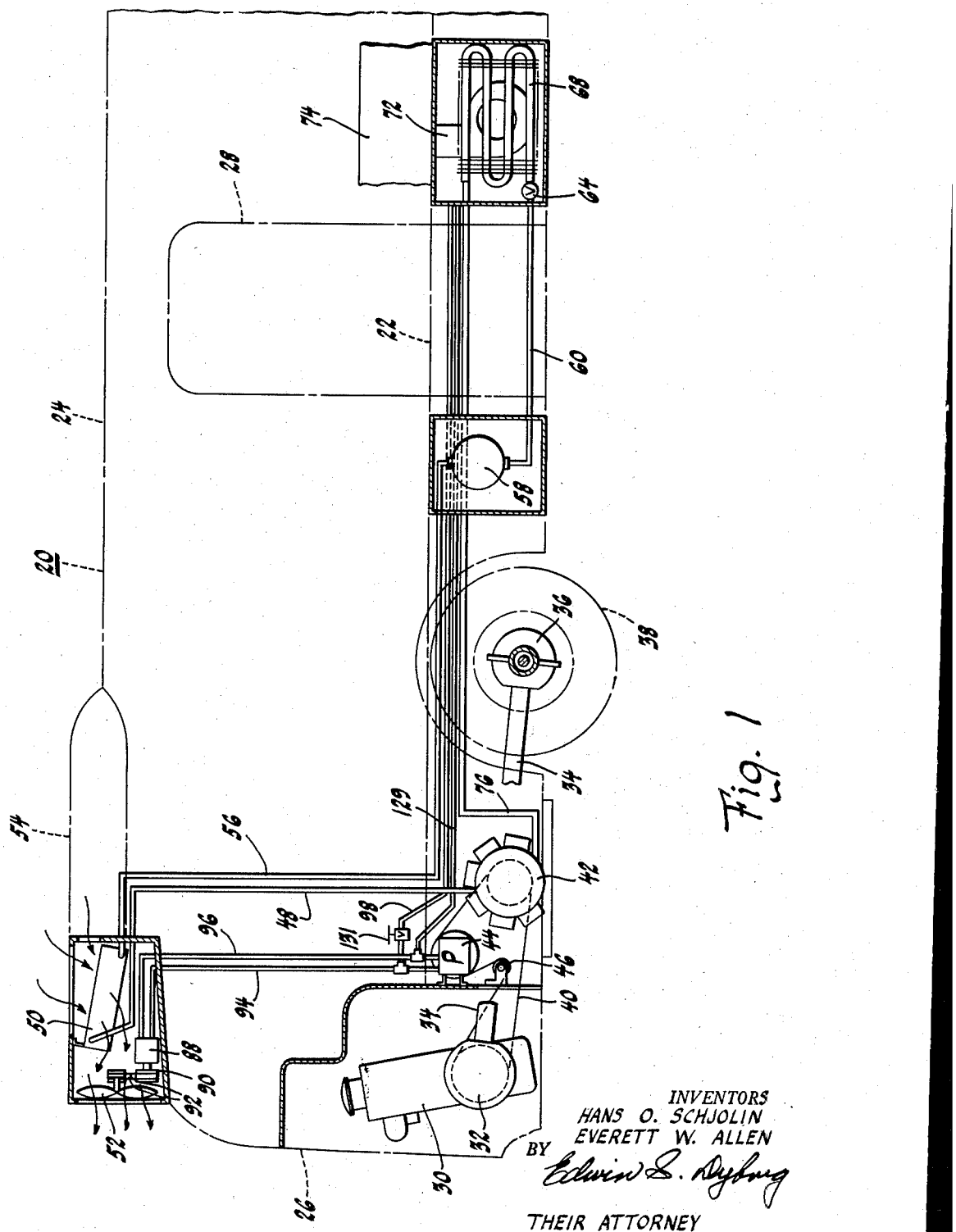

July 8, 1958 H. O. SCHJOLIN ET AL 2,841,963
REFRIGERATING APPARATUS
Filed Oct. 18, 1956 2 Sheets-Sheet 1

INVENTORS
HANS O. SCHJOLIN
EVERETT W. ALLEN
BY Edwin S. Dybvig
THEIR ATTORNEY

July 8, 1958

H. O. SCHJOLIN ET AL 2,841,963

REFRIGERATING APPARATUS

Filed Oct. 18, 1956

2 Sheets-Sheet 2

INVENTORS
HANS O. SCHJOLIN
EVERETT W. ALLEN
BY
Edwin S. Dybvig

THEIR ATTORNEY

United States Patent Office 2,841,963
Patented July 8, 1958

2,841,963

REFRIGERATING APPARATUS

Hans O. Schjolin and Everett W. Allen, Birmingham, Mich., assignors to General Motors Corporation, Detroit, Mich., a corporation of Delaware Application October 18, 1956, Serial No. 616,848

5 Claims. (Cl. 62—244)

This invention relates to refrigerating apparatus and more particularly to motor vehicles such as buses provided with air-conditioning systems.

It has recently been the practice in air conditioning busses to provide at the upper rear thereof a condenser, a fan for circulating the air through the condenser, a compressor for delivering refrigerant to the condenser and a relatively small independent internal combustion engine separated from and independent of the engine for driving the bus. This small independent engine is used for driving the compressor and the condenser fan. To reduce the cost of the air-conditioning system it is proposed at this time to drive the compressor from the driving engine of the bus. To keep the condensing pressure reasonably low it is found that the condenser fans required more energy (such as five horsepower) than is practical to supply from the electrical system of the bus. It is also desired that the passenger compartment be unobstructed by belt or shaft driving devices even if enclosed.

It is therefore an object of this invention to provide a bus with an air-conditioning system providing an inexpensive structurally convenient and simple drive for the condenser fans from the driving engine of the bus.

It is another object of this invention to provide a suitable hydraulic constant speed driving system for driving the condenser fan or fans from the variable speed driving engine of the bus.

These and other objects are obtained in the form shown in the drawings by driving the refrigerant compressor and hydraulic pump as well as the bus itself from a bus driving engine located at the lower rear of the bus. The condenser and condenser fans are located at the upper rear of the bus. The condenser fans are driven by a constant speed hydraulic motor of about five horsepower capacity connected by suitable conduits to the hydraulic pump. If desired, the evaporator fans may also be similarly driven.

Further objects and advantages of the present invention will be apparent from the following description, reference being had to the accompanying drawings, wherein a preferred form of the present invention is clearly shown.

Figure 2:
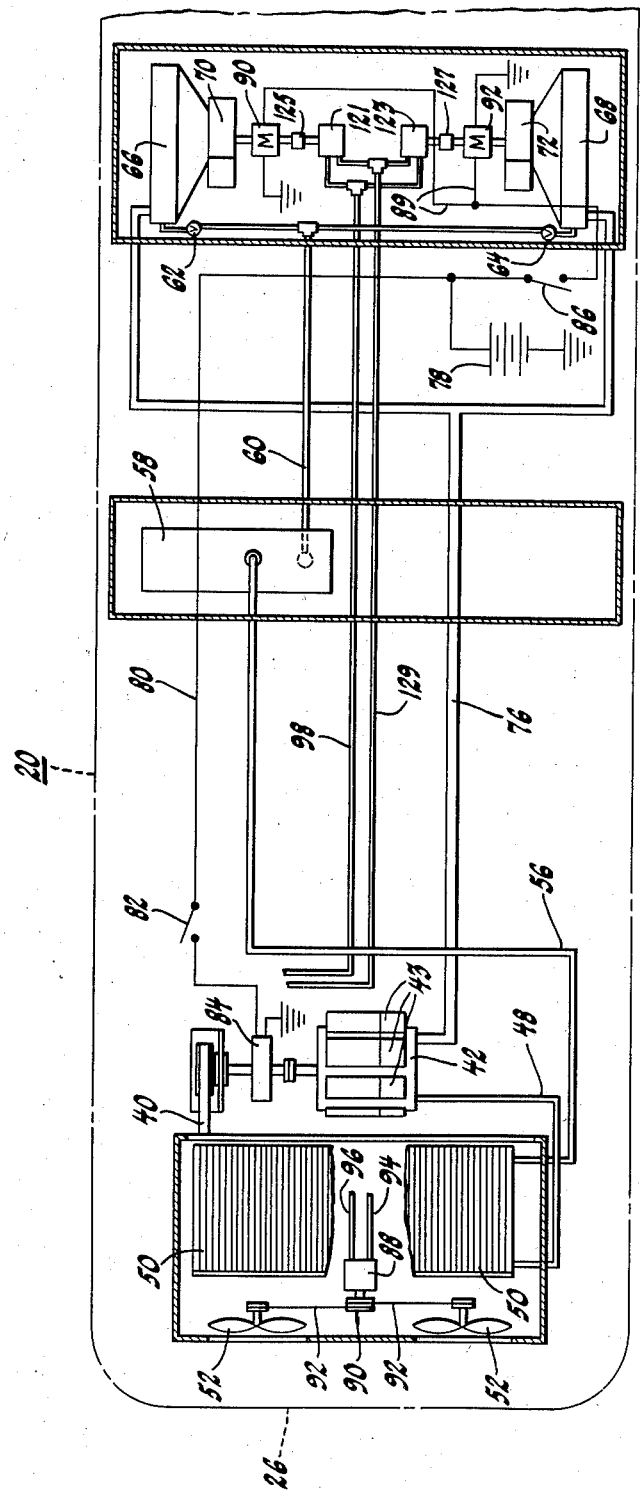

In the drawings:

Figure 1 is a diagrammatic view in elevation of the rear portion of a motor bus showing one form of my invention; and Figure 2 is a diagrammatic plan view of Figure 1.

Referring now to the drawings is shown diagrammatically a bus 20 in which the floor as indicated at 22 and the roof at 24 and the rear at 26. Also indicated is a rear door 28. At the lower rear portion of the bus is the bus driving engine 30 which through a suitable transmission 32 and a propeller shaft 34 connects to the rear axle 36 provided at its ends with the wheels 38 for driving a bus. Through the belt 40 and suitable pulleys, the engine 30 also drives a multi-cylinder compressor 42 and a hydraulic pump 44. The tension on the belt may be maintained by a spring mounted idler pulley 46. The compressor 42 is preferably provided with an arrangement whereby the cylinders may be consecutively unloaded as the speed of the engine 30 increases so as to make more constant the delivery of refrigerant by the compressor 42.

The compressor 42 delivers compressed refrigerant through the conduit 48 to the condenser 50 located at the rear of the roof 24 of the bus 20. To accommodate the condenser 50 and its dual fans 52, the roof of the bus is provided with a bulge or a pod designated by the reference character 54. The condenser 50 is drained by the conduit 56 which extends to the receiver 58. From the receiver 58 liquid refrigerant flows through the supply conduit 60 having lateral branches extending to the expansion valves 62 and 64. The expansion valves 62 and 64 control the flow of liquid refrigerant into the evaporator 66 and 68 located on opposite sides of the bus beneath the floor. Air from the interior of the bus is drawn through (and is cooled by) the evaporators 66 and 68 by the centrifugal fans 70 and 72. These fans 70 and 72 discharge into the duct distributing systems 74 on either side of the bus which discharge the cool air uniformly throughout the passenger compartment of the bus. The heat from the air flowing in heat transfer contact with the evaporators 66 and 68 evaporates the refrigerant which returns through the conduit 76 to the suction intake of the compressor 42.

There is also provided an electrical system which includes a battery 78, one side of which is grounded. The other side of the battery is connected by a conductor 80 and a switch 82 through an electrically controlled clutch 84 which controls the connection between the belt drive 40 and the compressor 42. The battery 78 also connects through the switch 86 and the conductors 89 to the electric fan driving motors 90 and 92.

To keep down the head pressure within the condenser 50, it is found desirable to use two fans 52 and drive them with a five horsepower motor. A five horsepower motor requires more current than the normal electrical system on a bus can conveniently provide. According to this invention, the fans 52 are driven by the five horsepower constant speed hydraulic motor 88 which through a dual pulley 90 and the belt 92 drives the fans 52 at a suitable speed for cooling the condenser 50. This constant speed hydraulic motor 88 is connected by the conduit 94 with the discharge outlet of the hydraulic pump 44 while the suction entrance of the pump is connected by the conduit 96 to the discharge conduit of the hydraulic motor 88. Through this arrangement the constant speed hydraulic motor preferably has a capacity and speed to drive the fans at a sufficient rate to keep the condenser 50 relatively cool.

If desired, a branch conduit 98 may extend from the conduit 94 to the hydraulic motors 121 and 123. These motors 121 and 123 are preferably connected through one-way clutches 125 and 127 with the shaft of the electric driving motors 90 and 92. The discharge from the hydraulic motors 121 and 123 is conducted by the conduit 129 to the conduit 96 feeding the inlet to the pump 44. A manual valve 131 is provided at a convenient point in the conduit 98 so that when it is closed the hydraulic motors 121 and 123 are inactive. Whereas it may be opened when it is desired to operate the pumps 121 and 123. The one-way clutches 125 and 127 permit the hydraulic motors to drive through the electric motors 90 and 92 to rotate the fans 70 and 72. However these clutches disconnect the electric motors from the hydraulic motors when the hydraulic motors 121 and 123 are idle to permit the electric motors 90 and 92 to operate without being burdened by the drag of the hydraulic motors 121 and 123.

This makes a simple practical system in which the hydraulic conduits may be located wherever convenient so that the passenger compartment will be substantially unobstructed by the conduits. This arrangement also reduces the cost of the system.

The multiple cylinder compressor 42 may have a speed responsive sequential cylinder unloading mechanism 43 in which the cylinders are unloaded one by one as the speed rises or the load is reduced. This may be of the type shown in United States Patent 2,185,473 issued January 2, 1940.

While the form of embodiment of the invention as herein disclosed constitutes a preferred form, it is to be understood that other forms might be adopted, as may come within the scope of the claims which follow.

What is claimed is as follows:

1. In a passenger vehicle having a passenger compartment provided with a floor and a roof, a driving means for said vehicle located adjacent the floor, an air conditioning means for said passenger compartment including a compressor driven by and operable coincidentally to the operation of said driving means and an air cooled condenser located adjacent the roof and an evaporating means located adjacent the passenger compartment, means for circulating air in heat exchange relation with said evaporating means into said passenger compartment, fan means located adjacent said condenser for circulating air into heat exchange relation with said condenser, a hydraulic motor adjacent said condenser for driving said fan means, and a hydraulic pump adjacent to and driven by said driving means for supplying fluid under pressure to said hydraulic motor.

2. In a passenger vehicle having a passenger compartment provided with a floor and a roof, a driving means for said vehicle, an air conditioning means for said passenger compartment including a compressor driven by and operable coincidentally to the operation of said driving means and an air cooled condenser located adjacent the roof and an evaporating means located beneath the floor of said passenger compartment, motor driven fan means for circulating air into heat exchange relation with said evaporating means and discharging the cooled air into the passenger compartment, fan means located adjacent said condenser for circulating air into heat exchange relation with said condenser, a substantially constant speed hydraulic motor adjacent said condenser for driving said fan means, and a hydraulic pump adjacent to and driven by and operable coincidentally to the operation of said driving means for supplying fluid under pressure to said hydraulic motor.

3. In a passenger vehicle having a passenger compartment provided with a floor and a roof; a driving means for said vehicle; an air conditioning means for said passenger compartment including a compressor, an air cooled condenser located adjacent said roof, and an evaporating means located beneath the floor of said passenger compartment; fan means circulating air into heat exchange relation with said evaporating means and discharging the cooled air into said passenger compartment; enclosure means for said condenser having an air inlet opening in its top wall and an air outlet opening in its rear wall; condenser cooling fan means located adjacent said condenser and cooperating with said enclosure means for pulling outside air in through said inlet opening and flowing said outside air into heat exchange relation with said condenser and thereafter discharging said air rearwardly through said outlet opening; a hydraulic motor drivingly connected to said condenser cooling fan means; a hydraulic pump adjacent to and driven by said driving means for supplying fluid under pressure to said hydraulic motor; and means transmitting power from said driving means to said compressor and said hydraulic motor including a clutch for disconnecting said compressor from said driving means.

4. In a passenger vehicle having a passenger compartment provided with a floor and a roof; a driving means for said vehicle; air conditioning means for said passenger compartment including a compressor driven by said driving means, an air cooled condenser located adjacent said roof, and an evaporating means located beneath the floor of said passenger compartment; means circulating air to be conditioned into heat exchange relation with said evaporating means and discharging the cooled air into said passenger compartment; enclosure means for said condenser having an air inlet in its top wall and an air outlet in its rear wall; fan means located adjacent said condenser and cooperating with said enclosure means for pulling air in through said inlet and directing said air into heat exchange relation with said condenser and then out through said outlet; a hydraulic motor within said enclosure drivingly connected to said fan means; and a hydraulic pump adjacent to and driven by said driving means for supplying fluid under pressure to said hydraulic motor.

5. In a passenger vehicle having a passenger compartment provided with a floor and a roof; a driving means for said vehicle; an air conditioning means for said passenger compartment including a compressor driven by said driving means, an air cooled condenser located adjacent the rear portion of said roof, and an evaporating means; fan means circulating air to be cooled into heat exchange relation with said evaporating means and discharging the cooled air into said passenger compartment; enclosure means for said condenser having an air inlet in its top wall and an air outlet in another wall; condenser cooling fan means located adjacent said condenser for pulling air in through said inlet into heat exchange relation with said condenser and out through said outlet; a hydraulic motor within said condenser enclosure means drivingly connected to said condenser cooling fan means; a hydraulic pump adjacent to and driven by said driving means for supplying fluid under pressure to said hydraulic motor; and means for transmitting power from said driving means to said compressor and said hydraulic motor including a clutch for connecting and disconnecting said compressor from said driving means.

References Cited in the file of this patent

UNITED STATES PATENTS

| | | |
|---|---|---|
| 2,000,477 | Carry | May 7, 1935 |
| 2,185,473 | Neeson | Jan. 2, 1940 |
| 2,669,098 | Buell | Feb. 16, 1954 |
| 2,718,763 | Burgess et al. | Sept. 27, 1955 |
| 2,753,696 | Guerra et al. | July 10, 1956 |